Oct. 23, 1956
E. I. RADZIMOVSKY
2,767,592
TRANSMISSION MECHANISM
Filed April 23, 1954
2 Sheets-Sheet 1
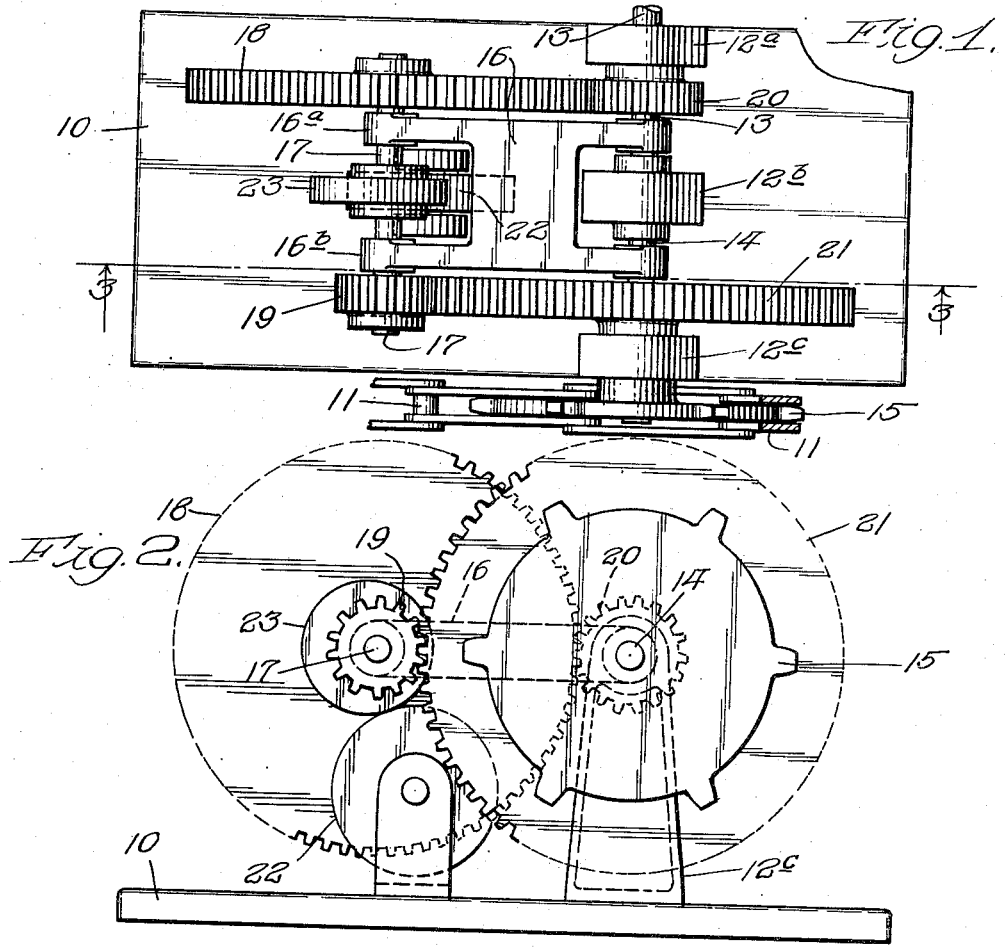
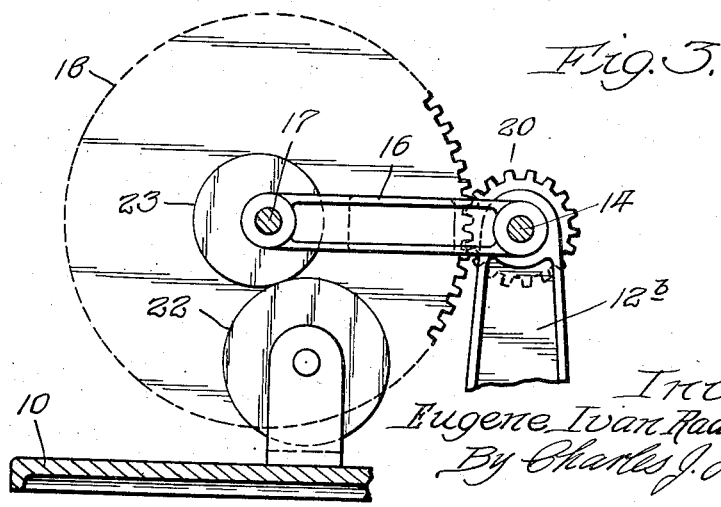
Inventor:
Eugene Ivan Radzimovsky,
By Charles J. Merriam,
Atty.

United States Patent Office 2,767,592
Patented Oct. 23, 1956

2,767,592

TRANSMISSION MECHANISM

Eugene Ivan Radzimovsky, Champaign, Ill., assignor to University of Illinois Foundation, a nonprofit corporation of Illinois Application April 23, 1954, Serial No. 425,076

3 Claims. (Cl. 74—394)

This invention relates to a transmission mechanism for a sprocket driven chain, and more particularly to such a mechanism that equalizes the linear velocity of a driven chain which has a relatively long pitch.

Sprocket driven chains have had increasing industrial use in the form of conveyors, elevators and the like. In many of these uses it is necessary that the chain move at a constant linear speed. This need is obvious, for example, in the transporting of delicate objects like moulds, or in sensitive operations such as the deposition of uniform films on conveyed objects.

In addition, substantial savings can be achieved in the materials used to construct a conveyor when a constant linear speed is assured. The provision of a constant speed chain eliminates the need for oversizing the various parts of the conveyor to enable them to withstand repeated additional dynamic loads resulting from changes in the speed of the conveyor. This is important because it is usually more economical to run a conveyor at the highest speed possible, and such additional dynamic loads increase with chain velocity.

A primary factor in causing uneven speeds of sprocket driven chains is the difference between the true pitch circle and the chordal path along which the pitch of polygonal sprocket wheels is measured. In chains having long pitches, the pulsating motion produced by the variation of the sprocket profile from a true circle is especially pronounced. The uneven motion produced by this difference results in repeated accelerations and decelerations of the chain, causing additional dynamic loads to be applied.

The irregularities in velocity which occur during the period of time required for the sprocket to rotate through an arc subtended by a chord equal in length to the pitch of the chain have correspondingly changing accelerations. A positive acceleration occurs at the instant a sprocket tooth engages a chain link and continues in a decreased positive fashion through the first half of pitch travel. The acceleration changes at the mid-point of pitch travel and has an increasing negative acceleration during the second one half pitch travel. Thus, at the instant of engagement of the leading edge of a sprocket tooth with a chain link, there is a change from negative to positive acceleration of the chain, which imposes a dynamic load on the chain.

Attempts in the past to minimize the effect of these additional dynamic loadings have consisted of increasing the critical cross section of the chain links in order to make the chain stronger. This is only a partial remedy because the weight of the chain is increased thereby which in turn increases the dynamic loads. In addition, a further disadvantage results in that the production and operating costs of the chain increase also with an increase in the chain weight.

Another expedient that has been employed has been to increase the number of teeth in the driving sprocket. It is apparent that this design change results in a sprocket profile that more closely approximates a true circle. However, an increase in the number of sprocket teeth leads to an increase in sprocket diameter which occasions a proportional decrease in the R. P. M. of the sprocket. The slower the sprocket runs, the larger will be the velocity ratio in any transmission connecting a prime mover with the sprocket. The larger the velocity ratio in any transmission, the greater the possibility of power loss. Although this power loss may be partially avoided by decreasing the chain pitch, it is not always possible to decrease the pitch below certain limits because the length of a chain link is determined often by the dimensions of the aprons, buckets or other members supported by the chain. Furthermore, chains with shorter links are heavier and more expensive to produce and operate than longer link chains of equal capacity.

Equalizing devices to avoid these problems are known to the art, but these have had other practical defects either as to cost, complexity, or production or performance difficulties.

An additional problem is encountered because of speed variation in the operation of vertical conveyors such as elevators. Any pulsation of the chain resulting from speed variations can produce a vibration that can extend for a long distance from the sprocket. If the frequency of the vibration thereby induced happens to be close to the natural frequency of the system or to one of its harmonics, the amplitude of these vibrations could reach a dangerous magnitude.

The equalizing transmission mechanism of my invention has a number of advantageous features. I am able to cause perfect equalizing of a conveyor chain velocity by the use of my transmission mechanism, and it can be designed to any conveyor capacity because the magnitude of transmitted power is not restricted. Furthermore, the mechanism is simultaneously both a speed reducer and conveyor equalizer in that the same gears which act as a speed reducer also act as elements of the equalizing mechanism. Therefore, the cost and dimensions of the reducer are minimized. Also, there is no additional power loss in the gears and the efficiency of the drive is nearly equal to that of an ordinary reducer of the same capacity. The gears used in this reducer are ordinary cylindrical gears which can be produced with high accuracy. Therefore, their efficiency is as high and their cost is as low as ordinary reducer gears.

My invention consists of a mechanism that exactly compensates for variations in the velocity of a conveyor chain caused by the inability of the sprocket driving the chain to translate a constant angular velocity into a constant linear velocity. As pointed out above, this inability results from the difference between the true pitch circle and the chordal path along which the pitch of a polygonal sprocket wheel is measured, resulting in a series of increased and decreased velocities as links of the chain engage the leading edges of the sprocket teeth.

The changes in velocity to which I refer are those in the direction of chain travel since it is apparent that velocity in a direction tangential to the sprocket will always be constant when the angular velocity of the sprocket is constant. The velocity in the direction of chain travel is only equal to the tangential velocity when the sprocket tooth is applying pressure in the direction of chain travel. At any other time, there is a component of the applied pressure normal to the direction of chain travel which results in a lower instantaneous velocity in the chain travel direction. This phenomenon occurs in sprocket driven chains, in contrast to pulley and belt systems, because there is a finite length of chain in engagement with the sprocket wheel.

I call the velocity component in the direction of chain travel $v_x$. It has an instantaneous value determined from the following equation:

(1) $\qquad v_x = v_c \cos \theta = \omega_2 R \cos \theta$

In Equation 1 $v_c$ is the circumferential velocity of the sprocket which is equal to the product of the angular velocity of the sprocket, $\omega_2$, and the radius of the sprocket, R. The angle $\theta$ represents the angle between the position occupied by the radius of a sprocket at the moment when pressure on the sprocket is applied entirely in the direction of chain travel and the position occupied by the same radius at the moment the instantaneous velocity is to be determined.

By the mechanism of my invention, I am able to supplement the constant angular velocity applied to the driving sprocket with an incremental pulsating angular velocity of exactly the correct magnitude to produce an incremental pulsating linear velocity having the same direction as, but opposite sign from, the pulsating linear velocity in the direction of chain travel which is found in the chain being driven by the sprocket.

In the transmission mechanism which I have devised to rectify the aforementioned variations of linear chain velocity, I include a housing equipped with a rotatably mounted input shaft and a rotatably mounted output shaft. The input shaft is capable of receiving angular rotation from some power source or prime mover remote from the housing. The output shaft has the chain driving sprocket fixedly mounted on it and is so arranged that the housing will not interfere with the operation of the chain. The input and output shafts have the same axis.

Parallel to the axis of these two shafts is a third shaft which is pivotally mounted in the housing on the axis of these two shafts so that it may pivot about that axis through a small angular distance. This third shaft, or planetary shaft, is equipped with one or more gears which are so arranged and spaced from the input and output shafts that these planetary gears will mesh with gears mounted on the input and output shafts.

Roller means are rotatably mounted on the base of the housing in spaced relation to the planetary shaft, and a non-circular cam is fixed to the planetary shaft and arranged to bear against the roller means. The profile of the non-circular cam is so arranged as to impart a pulsating angular velocity to the planetary shaft, and thus to the chain driving sprocket, when the input shaft is attached to a means for rotating it at a constant angular velocity, the pulsating angular velocity being such as to exactly compensate for variations in the chain travel direction component of the linear chain velocity produced by successive engagements of sprocket teeth with links of the chain.

My invention will be explained in conjunction with the following drawings in which:

Figure 1 is a top plan view of the transmission mechanism;

Figure 2 is an elevational view of the mechanism shown in Figure 1;

Figure 3 is a fragmentary sectional view taken along the line 3—3 of Figure 1;

Figure 4:
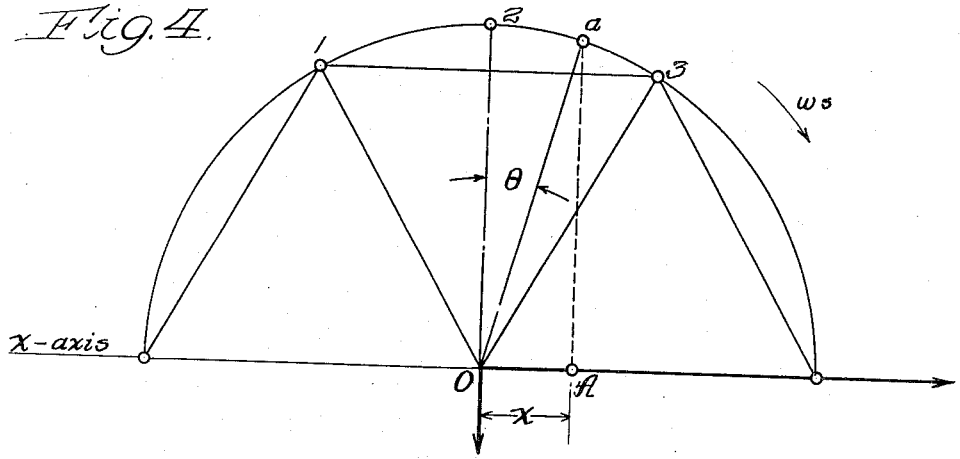
Figure 4 is a fragmentary schematic representation of a 6-toothed sprocket to which reference is made in describing the design of the non-circular cam portion of my transmission mechanism.

My equalizer mechanism includes a platform 10 preferably located adjacent a chain 11 which is to be driven through the equalizer mechanism. Bearing pedestals 12a, 12b and 12c are mounted on the platform 10 and arranged with their bearing openings in coaxial relation so as to receive input shaft 13 and output shaft 14 in coaxial relation to each other. Input shaft 13 is rotatably mounted in bearing pedestals 12a and 12b, while output shaft 14 is rotatably mounted in pedestals 12b and 12c, the two shafts each terminating in pedestal 12b. In actual practice, the entire mechanism may be encased in a housing integral with platform 10 in which case the shafts will be rotatably mounted in the housing and only intermediate common bearing pedestal 12b is required.

Input shaft 13 is adapted to receive rotary motion from a source of power like an electric motor or other prime mover (not shown). Affixed to output shaft 14 is sprocket 15 which is in operative engagement with the links of chain 11. The sprocket shown in Figure 1 has six teeth. As the transmission mechanism of this invention is for use with a driven chain that has a relatively long pitch, the number of sprocket teeth will always be relatively small.

An H-shaped arm member 16 has one end pivotally mounted on shafts 13 and 14 and straddling bearing pedestal 12b. The bifurcated end of arm member 16 opposite to that mounted on coaxial shafts 13 and 14 is provided with yokes 16a and 16b which rotatably support planetary shaft 17.

Affixed to the projecting ends of shaft 17 outboard of the yokes 16a and 16b are cylindrical gears 18 and 19. Gear 18 meshes with and is driven from a cylindrical gear 20 fixed to input shaft 13 intermediate bearing pedestals 12a and 12b and outboard of the pivotal connection of arm member 16 to shaft 13. Gear 19 meshes with and is driven from a cylindrical gear 21 fixed to output shaft 14 intermediate of bearing pedestals 12b and 12c and outboard of the pivotal connection of arm member 16 to shaft 14. Gears 18, 19, 20 and 21 may be of any suitable type such as spur, helical or herringbone gears.

In the preferred embodiment, the diameters of the gears are sized as to permit of speed reduction in that gear 18 is larger than gear 20 and gear 21 is larger than gear 19. It is apparent that only one planetary gear is necessary if no speed reduction is desired, since the planetary path of shaft 17 can be determined by a curved slot in a housing, eliminating the need for arm member 16 so that both gears 20 and 21 can engage the same planetary gear.

Whether or not speed reduction is provided, the number of teeth in gear 21 must be the product of the number of teeth in gear 19 times a whole number. For reasons explained below, the number of teeth in the sprocket must always be equal to the same whole number.

Fixed on shaft 17 intermediate of yoke portions 16a and 16b is non-circular cam 23 engaged by a cam roller 22 rotatably mounted in a bracket on platform 10.

The profile of non-circular cam 23 is such as to apply a pulsating angular velocity to output shaft 14, the value of the pulsating angular velocity gradually decreasing and increasing in a partially cosinusoidal manner.

The method of operation of my equalizing transmission mechanism is as follows. Upon receiving a rotary motion from a power source (not shown), input shaft 13 will start to rotate. The rotary motion of this shaft is transmitted through gears 20 and 18, causing shaft 17 to rotate at a speed determined basically by the speed of the driving motor and the gear ratio of gears 20 and 18. Because gear 19 is fixed to the same shaft as gear 18, it will rotate with the same angular velocity, and transmit this angular motion to output shaft 14 through gear 21. A further speed reduction is possible by sizing of gears 19 and 21.

At the same time that shaft 17 is rotating due to the application of rotary motion through gears 20 and 18, non-circular cam 23 is also rotating, being in intimate contact with roller 22. Because of its non-circular profile, cam 23 causes shaft 17 and its associated gears 18 and 19 to follow an oscillatory motion about the axis of shafts 13 and 14 with an amplitude equal to the difference between the maximum and minimum cam radii. Thus, the entire gear system operates as a planetary gear drive with gears 20 and 21 acting as sun gears and gears 18 and 19 as planet gears.

As a result of the swinging motion of shaft 17, gear 21 receives an additional alternating angular velocity. The period of the alternating velocity is equal to the time required for gear 19 to make one revolution, and must also be equal to the time needed for a chain length to go the distance equal to its length (equal to the chain pitch). Thus, as stated above the ratio between the number of teeth of gears 21 and 19 must be equal to the number of teeth on the sprocket 15.

The profile of the equalizing cam 23 is designed so that the sprocket 15 receives a pulsating revolving motion which causes the chain to move with a constant velocity. For any given chain and transmission system, there is only one equalizing cam profile that will exactly equalize the conveyor chain velocity. The profile is computed according to the following mathematical development.

For a constant chain velocity, the sprocket must be driven with a variable angular velocity, $\omega_s$, which is a function of the angular position of the sprocket (angle $\theta$ in Fig. 4). The constant chain velocity, $v_0$, and the variable angular velocity of the sprocket, $\omega_s$, are related by the expression:

(2) $$v_0 = \omega_s R \cos \theta$$

From equations (1) and (2), it follows that:

(3) $$\omega_s = \frac{v_0}{v_x} \omega_2$$

But the variable angular velocity $\omega_s$ of the sprocket and therefore of shaft 14 and gear 21 is the sum of the constant angular velocity $\omega_2$ of the output shaft 14 when pivot arm 16 is considered stationary, and the additional variable angular velocity $\omega_2'$ of the sprocket due to the oscillatory motion of the arm member 16. Stated as an equation:

(4) $$\omega_s = \omega_2 + \omega_2'$$

Rearranging Equation 4 and substituting the value of $\omega_s$ from Equation 3, the additional variable angular velocity $\omega_2'$ of the sprocket which is needed for constant chain velocity is:

(5) $$\omega_2' = \frac{v_0}{v_x} \omega_2 - \omega_2$$

Combining Equation 5 with Equation 1, the expression for the additional variable angular velocity $\omega_2'$ becomes:

(6) $$\omega_2' = \frac{v_0}{R \cos \theta} - \omega_2$$

This additional variable angular velocity, $\omega_2'$, is obtained by the oscillatory motion of the planetary arm member 16. In order to produce this velocity the variable angular velocity of the arm must be equal to:

(7) $$\omega_a = \omega_2' \cdot i_p$$

where $i_p$ is the velocity ratio between planetary arm 16 and the sprocket when the input shaft 13 and the sun gear 20 are considered stationary. Then the gear system is operating as a planetary drive with the planetary arm as the driving member and the sprocket and output shaft 14 the driven members. Combining Equations 7 and 5, the following equation results:

(8) $$w_a = \omega_2 \left( \frac{v_0}{v_x} - 1 \right) i_p$$

However, the variable angular velocity of the planetary arm 16, $\omega_a$, is related to the additional variable angular velocity of cam member 23 and planetary shaft 17, $\omega_3'$, by the velocity ratio $i_a$ between planetary arm 16 and planetary shaft 17 when input shaft 13 and sun gear 20 are considered stationary and the gear system is operating as a planetary drive, according to the relationship:

(9) $$\omega_a = i_a \omega_3'$$

Combining equations (8) and (9), the following equation defining the additional variable angular velocity of the cam in terms of velocity ratios and the constant angular velocity of the output shaft 14 and sprocket is:

(10) $$\omega_3' = \frac{i_p}{i_a} \omega_2 \left( \frac{v_0}{v_x} - 1 \right)$$

The total variable angular velocity of the non-circular cam member 23 is the total of the average angular velocity of the cam, $\omega_3$, and the additional variable angular velocity of the cam, $\omega_3'$. The average angular velocity of the cam depends upon the constant angular velocity $\omega_2$ of the output shaft 14 when planetary arm member 16 is considered stationary and the velocity ratio, $i_s$, between planetary shaft 17, and therefore, the cam member 23, and output shaft 14, when arm member 16 is considered stationary, according to the following relationship:

(11) $$\omega_3 = \omega_2 \cdot i_s$$

Thus, the total variable angular velocity of the cam is as follows, wherein $\omega_e$ is the variable angular velocity of the cam:

(12) $$\omega_e = \omega_3 + \omega_3' = \omega_2 \cdot i_s + \omega_2 \frac{i_p}{i_a} \left( \frac{v_0}{v_x} - 1 \right)$$

By introducing the value of $v_x$, the variable chain velocity of the conveyor without use of an equalizer, the variation of the angular velocity of the cam can be expressed as a function of the angular position of the sprocket as represented by the angle $\theta$ in Fig. 4 as follows:

(13) $$\omega_e = \omega_2 \cdot i_s - \omega_2 \frac{i_p}{i_a} + \frac{i_p}{i_a} \cdot \frac{v_0}{R} \cdot \frac{1}{\cos \theta}$$

Also, by substituting the value of $v_x$ from Equation 1 in Equation 8, an equation expressing the variation of the angular velocity of the planetary arm as a function of the angular position of the sprocket can be expressed as follows:

(14) $$\omega_a = i_p \cdot \frac{v_0}{R} \cdot \frac{1}{\cos \theta} - i_p \omega_2$$

In order to determine the profile of the non-circular cam member 23 as is necessary to transform Equations 13 and 14 in such a way that the angular velocities $\omega_e$ and $\omega_a$ are expressed in functions of time, $t$. For a constant chain motion, the projection on the $x$-axis (point A in Figure 4) of the center of the leading joint of the chain (point $a$ in Figure 4) must move with a constant velocity $v_0$ equal to the equalized chain speed. This is given by the following equation:

(15) $$x = v_0 t$$

The corresponding location on the center of the leading joint (or leading sprocket tooth) on the circle at this instance is determined by the angle $\theta$. This angle is related to the distance $x$ by the equation:

(16) $$\sin \theta = \frac{x}{R} = \frac{v_0 t}{R}$$

Equation 16 may be transformed into a more convenient form for later integration by making use of the trigonometric relationship involving the cosine as follows:

(17) $$\cos \theta = \sqrt{1 - \frac{v_0^2 t^2}{R^2}}$$

By introducing Equation 17 into Equation 13, the angular velocity of the cam, $\omega_e$, is expressed as a function of the time, $t$, as follows:

(18) $$\omega_e = \omega_2 \cdot i_s - \omega_2 \frac{i_p}{i_a} + \frac{i_p}{i_a} \cdot \frac{v_0}{R} \frac{1}{\sqrt{1 - \frac{v_0^2 t^2}{R^2}}}$$

In the same fashion, Equation 14 may be changed so as to express the angular velocity of the arm member 16, $\omega_a$, as a function of the time, $t$:

$$\text{(19)} \quad \omega_a = i_p \frac{v_0}{R} \cdot \frac{1}{\sqrt{1 - \frac{v_0^2 t^2}{R^2}}} - i_p \omega_2$$

Variable angular velocity of the cam is as follows:

$$\text{(20)} \quad \omega_c = \frac{d\psi}{dt}$$

In this equation, $\psi$ is the angular position of the cam from a zero reference point, which corresponds to the zero position of the sprocket ($\theta=0$) in Figure 4. Equation 18 may be rearranged by the substitution of the value of $\omega_c$ from Equation 20 into the following form:

$$\text{(21)} \quad d\psi = \left(\omega_2 \cdot i_s - \omega_2 \frac{i_p}{i_a}\right) dt + \frac{i_p}{i_a} \cdot \frac{v_0}{R} \cdot \frac{dt}{\sqrt{1 - \frac{v_0^2 t^2}{R^2}}}$$

Upon integration, Equation 21 is converted to the following form:

$$\text{(22)} \quad \psi = \left(\omega_2 \cdot i_s - \omega_2 \frac{i_p}{i_a}\right) t + \frac{i_p}{i_a} \arcsin \frac{v_0 t}{R} + C$$

The constant of integration, $C$, is zero because at the initial conditions of $\psi=0$, $t=0$. Therefore, Equation 22 is expressed as follows:

$$\text{(23)} \quad \psi = \left(\omega_2 \cdot i_s - \omega_2 \frac{i_p}{i_a}\right) t + \frac{i_p}{i_a} \arcsin \frac{v_0 t}{R}$$

Since the variation of the angular velocity of the planetary arm 16 can be expressed as a function of the angular position of the sprocket as set forth in Equation 14 and because the same angular velocity is a function of the angle $\phi$ determining the position of the planetary arm 16 according to the formula:

$$\text{(24)} \quad \omega_a = \frac{d\phi}{dt}$$

the angle $\phi$ is determined from the following equation:

$$\text{(25)} \quad d\phi = i_p \frac{v_0}{R} \cdot \frac{dt}{\sqrt{1 - \frac{v_0^2 t^2}{R^2}}} - i_p \omega_2 dt$$

Upon integrating, the following equation results (the constant of integration again being zero):

$$\text{(26)} \quad \phi = i_p \arcsin \frac{v_0 t}{R} - i_p \omega_2 t$$

Thus Equations 23 and 26 represent expressions for the angular position of the equalizing cam 23 as a function of time and the corresponding angular position (angle of inclination from the zero position) of the arm member 16 of the planetary drive, respectively.

However, the displacement of the center of rotation of the cam as the function of the angle $\phi$ is:

$$\text{(27)} \quad S = \phi \cdot b$$

where $b$ is the length of the arm. (Because the angle $\phi$ is small, it may be assumed that the length of the arc, which is the locus of the center of rotation of the equalizing cam during the oscillatory motion of the arm, is equal to the chord of this arc.) The introduction of the value of $\phi$ from Equation 26 into Equation 27 results in the following equation:

$$\text{(28)} \quad S = \left(i_p \arcsin \frac{v_0 t}{R} - i_p \omega_2 t\right) b$$

Having the angle, $\psi$, the angular position of the equalizing cam 23, as a function of time and also having the corresponding displacements of the cam axis, S, as a function of time, the profile of the equalizing cam may be constructed as follows (see Figure 5): Draw a pitch circle having an arbitrary radius R with its center at the proposed center of cam rotation. Draw radial lines representing the relative angular positions, $\psi$, of the roller and cam where $\psi$ is the function of time. (The number of positions depends upon the accuracy desired in the cam layout.) Determine the value of S from Equation 28, corresponding to these relative angular positions and the distance thus determined is laid off from the base circle on the proper radial line. Circles having a diameter, $d$, equal to the roller diameter and centers at these distances from the base circle represent the positions of the roller relative to the cam for the angular position chosen. The heavy curve drawn tangent to the circle is the desired cam profile.

Time, $t=0$, corresponds to the position of a leading sprocket tooth at point 1, Figure 4. The time for the whole cycle equals the time required for the link joint to go the arc distance from point 1 to point 3 in Figure 4. The cam makes one whole revolution during this time. This period is also equal to the time needed for a chain link to go the distance equal to its length.

Since the time needed for the chain link to go the distance equal to its length is determined by the length of the link over the equalized velocity as given by the equation:

$$\text{(29)} \quad t_c = \frac{L}{v_0}$$

the limits of time to be used in Equations 23 and 28 can be expressed in terms of known variables. The beginning time, $t_1$, corresponds to point 1 in Figure 4 where a new sprocket tooth engages the chain and corresponds to the expression:

$$\text{(30)} \quad t_1 = \frac{-t_c}{2} = \frac{-L}{2v_0}$$

In a similar fashion, the upper time limit, $t_3$, corresponding to point 3 in Figure 4, the last instant where the tooth which commenced engagement at 1 is still the last tooth engaging the chain, or where a new tooth engages another link of the chain as at point 1, is given by the following expression:

$$\text{(31)} \quad t_3 = \frac{t_c}{2} = \frac{h}{2v_0}$$

Both points of time correspond to the cam position when angle $\psi$ is 180°.

EXAMPLE

The following represents an example of evaluating the profile of the equalizing cam. The following variables are assumed in this example:

Constant chain velocity, $v_0=3$ ft. per sec., 180 ft. per min.
Pitch length of the chain (length of a chain link) L=18 inches
No. of teeth in the sprocket, N, is 4

Type of gears used in the equalizing reducer transmission mechanism of the example are indicated below in Table I.

Table I

| Member No. | Diametrical Pitch | Teeth No. | Pitch Diameter "D" (inches) |
|---|---|---|---|
| 20 | 5.0 | 25 | 5.0 |
| 18 | 5.0 | 125 | 25.0 |
| 19 | 3.0 | 18 | 6.0 |
| 21 | 3.0 | 72 | 24.0 |

From the above constants, the following may be evaluated: The length of planetary arm 16, represented by the symbol $b$, is one half of the sum of the pitch diameters of members 20 and 18 and is equal to 15 inches.

The speed of the sprocket in revolutions per minute is determined by the constant chain velocity divided by the product of number of teeth in the sprocket and length of a chain link, being equal to 30 R. P. M. From the sprocket speed, the average angular velocity of the sprocket is determined to be 3.1416 radians per second.

The other expressions which are required for solving Equations 23 and 28, which values can be derived from the above assumed constants are as follows:

$$i_p = \frac{1}{1 - \frac{D_{20} \cdot D_{19}}{D_{18} \cdot D_{21}}} = 1.05263$$

$$i_a = \frac{1}{1 - \frac{D_{20}}{D_{18}}} = 1.250$$

$$i_s = \frac{D_{21}}{D_{19}} = 4.0$$

R, by definition is the radius of the circle circumscribed around the sprocket having, by assumption, four sides and a side length equal to L, or 18 inches. The R corresponding to such a pitch length is 12.7279 inches, determined from $$\frac{L}{2 \sin 45°}$$

The substitution of these constants into Equation 23 yields the expression:

(32)  $\psi = 9.9215\ t + 0.84210\ \text{arc sin}\ (2.38182\ t)$

In a similar fashion, substitution of the constants into Equation 28 results in the following equation:

(33)  $S = 15\ [1.05263\ \text{arc sin}\ (2.38182\ t) - 3.30837\ t]$

In the two above equations, $\psi$ is defined as the angle in radians, S is expressed as displacement in inches, and $t$ is the time in seconds.

The cam profile may be then ascertained by determining the values of $\psi$ and S for a number of increments of time, with the time for the cycle being ½ second. Therefore, the starting time is −0.25 second and the ending time is +0.25 second.

The tabulation of values of $\psi$ and S are found in Table II as functions of time.

Table II

| Time in Seconds | $\psi$ in Degrees | S in Inches |
|---|---|---|
| −0.250 | −180.000 | 0.000 |
| −0.225 | −161.179 | +0.269 |
| −0.200 | −139.696 | +0.427 |
| −0.175 | −124.459 | +0.505 |
| −0.150 | −106.405 | +0.522 |
| −0.125 | −88.490 | +0.494 |
| −0.100 | −70.679 | +0.432 |
| −0.075 | −52.945 | +0.345 |
| −0.050 | −35.269 | +0.240 |
| −0.025 | −17.626 | +0.123 |
| 0.000 | 0.000 | 0.000 |
| +0.025 | +17.626 | −0.123 |
| +0.050 | +35.269 | −0.240 |
| +0.075 | +52.945 | −0.345 |
| +0.100 | +70.679 | −0.432 |
| +0.125 | +88.490 | −0.494 |
| +0.150 | +106.405 | −0.522 |
| +0.175 | +124.459 | −0.505 |
| +0.200 | +139.696 | −0.427 |
| +0.225 | +161.179 | −0.269 |
| +0.250 | +180.000 | 0.000 |

Figure 5:
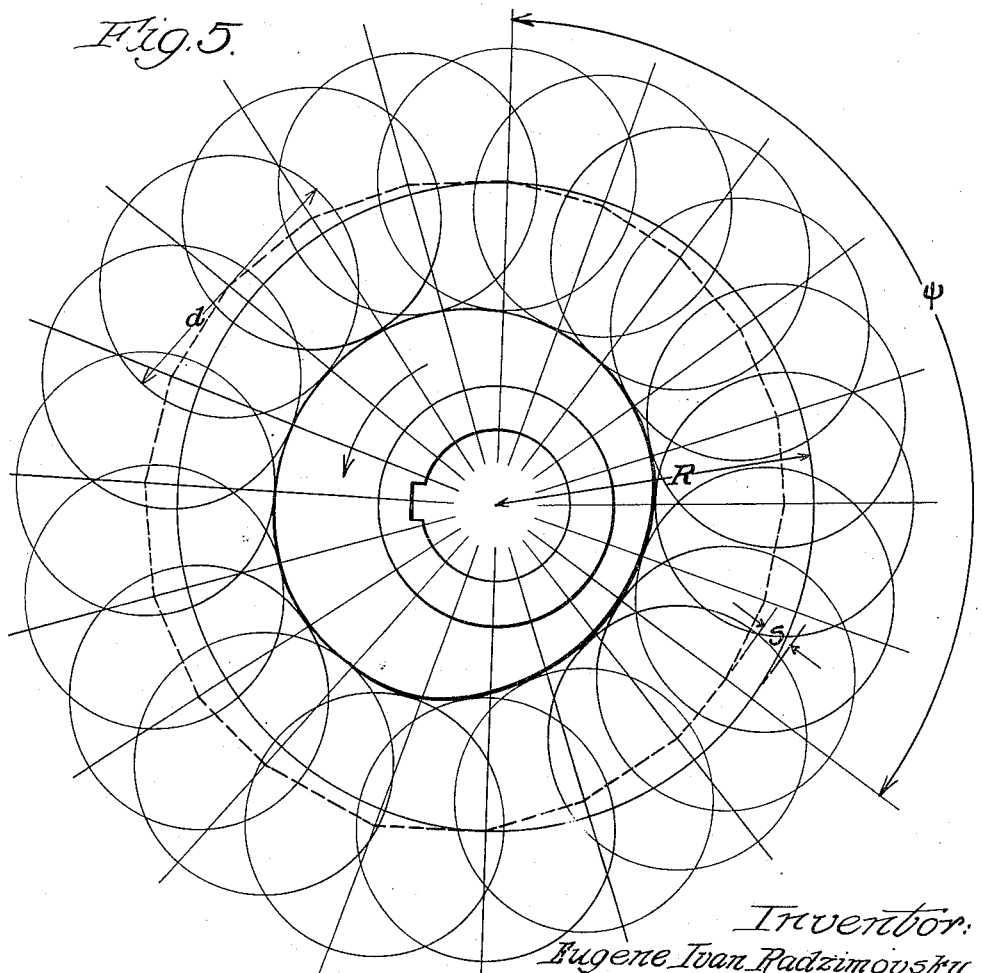
Figure 5 is a graphical plot constructed in the course of designing the profile of the non-circular cam.

From the values found in columns 2 and 3 of Table II, the profile of the equalizing cam represented in Figure 5 is constructed. The diameter of the supporting roller (roller number 27 in Figure 2) is selected with a diameter equal to 4 inches and the radius of the basic circle is equal to R=5 inches. This radius is equal to the distance between the roller axis and the cam axis when the cam is in its initial position, that is, when angles $\theta$, $\psi$, and $\phi$ are zero.

The foregoing detailed description is given for clearness of understanding only and no unnecessary limitations should be understood therefrom, as modifications should be obvious to those skilled in the art.

I claim:

1. In a driving mechanism for a sprocket driven chain having a given pitch length, a rotatably mounted input shaft, means for rotating the input shaft, a rotatably mounted output shaft in coaxial relation with said input shaft, a chain driving sprocket removably fixed on said output shaft, said sprocket having a tooth spacing equal to the pitch length of said chain, and a chain velocity equalizer comprising: a rotatable planetary shaft pivotally mounted on the axis of said input and output shafts; gear means fixed to said input shaft in operable engagement with gear means fixed to said planetary shaft; gear means fixed to said output shaft in operable engagement with gear means fixed to said planetary shaft; a roller rotatably mounted in spaced relation to said planetary shaft; and non-circular cam fixed to said planetary shaft and bearing against said roller means, said cam means being adapted to supplement a constant angular velocity received from the said input shaft with an incremental pulsating angular velocity for application to said chain driving sprocket, said incremental pulsating angular velocity having values equivalent to and opposite the variations in the chain travel direction component of linear chain velocity produced by engagement of a sprocket tooth with a link of the chain.

2. A driving mechanism of the character set forth in claim 1 wherein the said gear means fixed to the said input and planetary shafts are arranged to provide speed reduction between the speed of the means for rotating the said input shaft and the speed of the said planetary shaft.

3. A driving mechanism of the character set forth in claim 1 wherein the said gear means fixed to said planetary and output shafts are arranged to provide speed reduction between the speed of the said planetary shaft and the speed of the said output shaft.

References Cited in the file of this patent

UNITED STATES PATENTS

| | | |
|---|---|---|
| 1,324,472 | Sharp | Dec. 9, 1919 |
| 1,815,419 | Praetzel | July 21, 1931 |
| 1,975,126 | Scholin | Oct. 2, 1934 |
| 2,308,974 | Harper | Jan. 19, 1943 |
| 2,740,301 | Gartner | Apr. 3, 1956 |